(12) United States Patent  (10) Patent No.: US 7,895,585 B2
Prakash et al.  (45) Date of Patent: Feb. 22, 2011

(54) AUTOMATIC CODE TUNING

(75) Inventors: Raj Prakash, Saratoga, CA (US); Kurt J. Goebel, Dayton, OH (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1315 days.

(21) Appl. No.: 11/223,670

(22) Filed: Sep. 9, 2005

(65) Prior Publication Data

US 2007/0061784 A1 Mar. 15, 2007

(51) Int. Cl.
  G06F 9/44 (2006.01)
  G06F 9/45 (2006.01)
(52) U.S. Cl. .................. 717/151; 717/131; 717/140; 717/154
(58) Field of Classification Search .......... 717/151, 717/131, 154
  See application file for complete search history.

(56) References Cited

U.S. PATENT DOCUMENTS

| | | | | |
|---|---|---|---|---|
| 5,579,520 | A * | 11/1996 | Bennett ...................... | 717/151 |
| 5,778,212 | A * | 7/1998 | Dehnert et al. .............. | 717/155 |
| 5,950,009 | A | 9/1999 | Bortnikov et al. | |
| 5,966,538 | A * | 10/1999 | Granston et al. ............ | 717/158 |
| 6,718,544 | B1 * | 4/2004 | Humphreys et al. ......... | 717/158 |
| 2002/0066088 | A1 * | 5/2002 | Canut et al. ................. | 717/151 |
| 2003/0023957 | A1 | 1/2003 | Bau et al. | |
| 2004/0006760 | A1 * | 1/2004 | Gove et al. .................. | 717/100 |
| 2004/0049768 | A1 * | 3/2004 | Matsuyama et al. ......... | 717/141 |
| 2004/0117779 | A1 * | 6/2004 | Lagergren ................... | 717/153 |
| 2005/0038834 | A1 | 2/2005 | Souder et al. | |
| 2006/0064676 | A1 * | 3/2006 | Chavan ....................... | 717/124 |
| 2006/0236310 | A1 * | 10/2006 | Domeika et al. ............ | 717/140 |
| 2007/0094649 | A1 | 4/2007 | Chatterjee | |

OTHER PUBLICATIONS

Leupers et al. (An Executable Intermediate Representation for Retargetable Compilation and High-Level Code Optimization, International Workshop on Systems, Architectures, Modeling, and Simulation (SAMOS), 2003).*
Granston et al. (Automatic recommendation of compiler options, In Proceedings of the Workshop on Feedback-Directed and Dynamic Optimization, 2001).*
Chow et al. (Feedback-directed selection and characterization of compiler optimizations, In Proceedings of the Workshop on Feedback-Directed and Dynamic Optimization, 2001).*

(Continued)

*Primary Examiner*—Lewis A Bullock, Jr.
*Assistant Examiner*—Hang Pan
(74) *Attorney, Agent, or Firm*—Polsinelli Shughart PC

(57) ABSTRACT

Automatically executing commands to process code (e.g., compile commands, interpret commands, etc.) and recording code characteristic metric values (e.g., file size, execution time, etc.) allows automatic code tuning. The automatic turning system may execute predefined commands on codes, automatically intelligently build commands, both execute predefined commands and intelligently build upon those predefined commands, etc. With the automatic intelligent building of commands to build more effective commands, an automatic tuning system can efficiently and judiciously search through available code development tool options to find the more effective combinations of options to generate executable codes.

20 Claims, 17 Drawing Sheets

OTHER PUBLICATIONS

Haneda et al. (Automatic Selection of Compiler Options using Non-Parametric Inferential Statistics, Proceedings of the 14th International Conference on Parallel Architectures and Compilation Techniques, 2005).*

Pan et al. (Rating Compiler Optimizations for Automatic Performance Tuning, Proceedings of the ACM/IEEE SC2004 Conference, 2004).*

Diniz et al. (Dynamic feedback: An effective technique for adaptive computing, Proceedings of the ACM SIGPLAN 1997 conference on Programming language design and implementation, 1997).*

Benitez, M. E. & Dividson, J. W., "A Portable Global Optimizer and Linker," Proceedings, of the SIGPLAN '88 Conference on Programming Language Design and Implementation, Atlanta Georgia, Jun. 22-24, 1988, pp. 329-338.

Cai, B., "Compiler Modifications to Support Interactive Compilation,"Thesis submitted to the Dept. of Computer Science, Florida State University, 2001, pp. 1-57.

Chow, K. & Wu, Y., "Feedback-Directed Selection and Characterization of Compiler Optimizations," 2nd ACM Workshop on Feedback-Directed Optimization (FDO), Haifa, Israel, Nov. 15, 1999, 10 pages.

Cohn, R. & Lowney, P. G., "Feedback directed optimization in Compaq's compilation tools for Alpha," 2nd ACM Workshop on Feedback-Directed Optimization, Haifa, Isreal, Nov. 15, 1999, 10 pages.

Cooper, K. D. et al., "Optimizing for Reduced Code Space using Genetic Algorithms," ACM SIGPLAN 1999 Workshop on Languages, Compilers, and Tools for Embedded Systems, (Atlanta, GA, USA), ACM Press, New York, NY, May 5, 1999, pp. 1-9.

Kistler, T & Franz, M., "Computing the Similarity of Profiling Data—Heuristics for Guiding Adaptive Compilation," Workshop on Profile and Feedback-Directed Compilation, Paris, France, Oct. 13, 1998, pp. 1-6.

Kulkarni P., "Performance Driven Optimization Tuning in Vista," Thesis submitted to the Department of Computer Science of The Florida State University, May 30, 2003, 86 pages.

Mock M., et al., "Calpa: a tool for automating selective dynamic compilation", 33rd Annual ACM/IEEE International Symposium on Microarchitecture, 2000, (Monterey, CA, USA), MICRO33, ACM Press, New York, NY, pp. 291-302.

Vegdahl S., "Phase Coupling and Constant Generation in an Optimizing Microcode Compiler," Proceedings of the 15th annual workshop on Microprogramming, IEEE, 1982, pp. 125-133.

Whitfield D.L. et al., "An approach for Exploring Code Improving Transformations," ACM Transactions on Programming Languages and Systems (TOPLAS), vol. 19, issue 6, Nov. 1997, pp. 1053-1084.

Zhao W. et al., "Vista: a system for interactive code improvement," Proceedings of the 2002 Joint Conference on Languages, Compilers, and Tools for Embedded Systems & Software and Compilers for Embedded Systems (LCTES'02-SCOPES'02), Berlin, Germany, Jun. 19-21, 2002.

Author Unknown, "javac—The Java Compiler," java.sun.com/products/jdk/1.1/docs/tooldocs/solaris/javac.html, 3 pages, at least as early as Feb. 2001.

Author Unknown, "Test Drive Comeau C++ Online," http://www.comeaucomputing.com/tryitout/, 3 pages, Mar. 2000.

Bothner, "A GCC Compiler Server," http://www.web.archive.org/web/20030802164109/http://per. bothner.com/papers/GccSummit03-slides/index.html, 14 pages, May 2003.

Delorie, DJ, "DJGPP Public Access Cross-Compiler," http://www.delorie.com/djgpp/comile/, 1 page, Jul. 1998.

Tschalar, Ronald, "Instructions for the JXXX Compiler Service," http://www.innovation.ch/java/java_comp_instr.html, 3 pages, Jun. 5, 1999.

Tschalar, Ronald, "JXXX Compiler Service," http://www.innovation.ch/java/java_compile.html, 2 pages, Nov. 1, 1998.

Non-Final Office Action, U.S. Appl. No. 11/223,715, 19 pages Aug. 28, 2009.

Amendment and Response to Non-Final Office Action, U.S. Appl. No. 11/223,715, 12 pages, Nov. 25, 2009.

Interview Summary, U.S. Appl. No. 11/223,715, 3 pages, Mar. 10, 2010.

* cited by examiner

Results for /home/rprak/mydemo/pec.out

- Log File
- ⦿ Sort by Number ○ Sort by Time (sec)

| Number | Compiler flags (Right click and save to download binary) | Status | Time (sec) | bytes |
|---|---|---|---|---|
| 1 | -xO3 | Passed | 0.80 | 43932 |
| 2 | -xO4 | Passed | 0.74 | 44844 |
| 3 | -xO5 | Passed | 0.74 | 44844 |
| 4 | -fast | Verification Failed | 0.73 | 43616 |
| 5 | -fast -fsimple=0 -fns=no | Passed | 0.70 | 43552 |
| 6 | -fast -fsimple=0 -fns=no -xipo | Passed | 0.74 | 53292 |
| 7 | -xO4 -xipo | Passed | 0.74 | 54008 |

Web Page with Multiple Metrics
1200

FIG. 12

Automatic Tuning & Troubleshooting System

Binary compiled with -pec ?
or a file listing binaries : /home/rprak/demo/ats_mcf/pec.out Run command ? pec.out input.txt > output.txt Verification command ? cmp output.txt output.gold New! Tune it! ?

☑ Advanced Options ?

Server name ? clpt.sfbay

Port ?

Compiler directory ?
or a file listing directories : /import/backend-blds/compilers/current/t ? -- Sample Actions --

Experiment options and actions ?

Extra build options ? -lm -xlinkopt

Link libraries automatically ? ☑

Performance metric command ?

Lower metric is better ? ☑

Application timeout in seconds ?   Assign exit code ? ○ Zero(pass) ● One(fail)

New! Stop on ? Duration hours:minutes ▼ :10

Dryrun? ☐

Debug? ☐

Additional ats flags ?

Run experiment! ?

Web Page with Advanced Tuning
Parameter Fields
1300

FIG. 13

AUTOMATIC CODE TUNING

BACKGROUND

1. Field of the Invention

The present invention relates to the field of code optimization. More specifically, the present invention relates to automatically tuning code.

2. Description of the Related Art

Tools for improving code performance are frequently not fully utilized. For example, compilers, such as that provided in the Sun Java System Services Suite (previously Sun ONE Studio) from Sun Microsystems, Inc., provide extensive functionality for improving code performance. However, many users of the compilers do not utilize the functionality. Users may not be entirely familiar with a compiler and its complexities, may not possess the resources to become familiar with the compiler or to utilize the extensive functionality, may not have the time within their code delivery schedule to apply the feature(s) to their code, etc. Hence, the default compilation environment is typically used. The default compilation environment will most likely have features enabled that are generally applicable to code. Relying on the default setting alone prevents discovery and utilization of the feature(s) available to improve performance of their code, essentially foregoing the capability to tailor a compilation environment for their code.

Numerous features and capabilities encumber a compiler tool because of the amount of manual effort required to select a set of optimization flags for an application. Sifting through the numerous combinations of optimization flags available for a compiler, even with the benefit of experience and knowledge about the compiler, may require significant investment in time of personnel for each code to be tuned.

SUMMARY OF THE INVENTION

It has been discovered that code can be automatically tuned with automatic execution of commands for processing code (e.g., translating, optimizing, etc.) along with recording code characteristic metric values (e.g., execution time, file size, number of delay events, etc.). An automatic tuning system automatically executes different translation commands, and perhaps, instruments code for runtime feedback. The automatic tuning system may execute predefined commands on codes, automatically intelligently build commands, both execute predefined commands and intelligently build upon those predefined commands, etc. Although various implementations are possible for an automatic tuning system, an extensible automatic tuning system can be configured to allow a more customized compilation environment for a code (e.g., configured to various target machines, configured to evolve the automatic tuning system, etc.). Configuration options may include frequency of runtime feedback runs (i.e., the number of runs for collecting feedback), frequency of non-feedback runs, etc. Although the automatic tuning system can tune source code, an executable binary that includes an intermediate representation of source code, such as portable executable code, provides information sufficient for tuning.

These and other aspects of the described invention will be better described with reference to the Description of Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A depicts an example network carrying code to a code tuning service provider. FIG. 1B depicts an exemplary system with a grid to tune code.

FIG. 7A depicts an example mechanism for monitoring system wide task information. FIG. 7B depicts an example of the system wide task monitor 701 causing throttling of task dispatch to the system.

FIG. 9A depicts an example flowchart for automatically intelligently building progressively more efficient commands. FIG. 9B depicts an example flowchart continuing from FIG. 9A.

FIG. 10A depicts an example flowchart for integrating automatic command building into automatic tuning with primer commands. FIG. 10B depicts an example continuation of the example flowchart depicted in FIG. 10A.

FIG. 12 depicts an example web page for presenting multiple metrics.

FIG. 13 depicts an example web page for a user to enter advanced tuning parameters.

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, realizations of the invention are described with reference to compilers, but other source code transformation mechanisms, such as interpreters, virtual machines, etc., may incorporate code tuning functionality. In other instances, well-known protocols, structures and techniques have not been shown in detail in order not to obscure the invention.

The term source code is used throughout the following description. The term source code is not limited to code written in a traditional high-level language, but includes any unit of code that is the source for another code unit. In other words, source code describes a code unit that can be translated, compiled, interpreted, optimized, etc., thus generating one or more other code units, whether those other code units are separate from the source code unit, the source code unit as modified, embedded into the source code unit, etc. In addition, the term "run" is used herein to refer to execution of one or more executable codes. Throughout the description, run is typically employed for referring to the portion of code tuning that executes an executable code generated from executing a command, regardless of whether the generated executable code is instrumented for runtime feedback or not instrumented for runtime feedback.

Figure 1A:
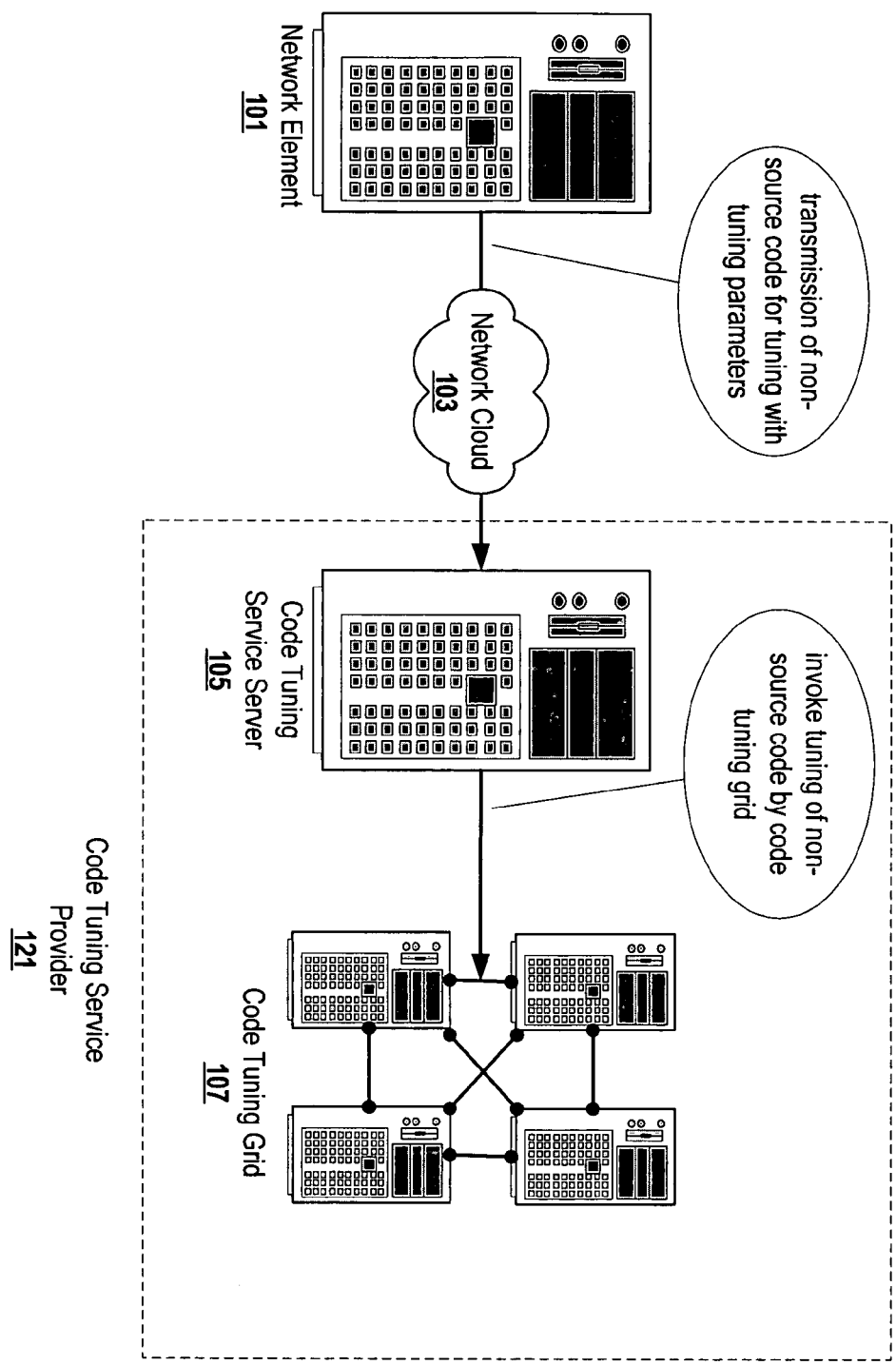
FIGS. 1A-1B depict an example network supporting a web-based tuning service.
Figure 1B:
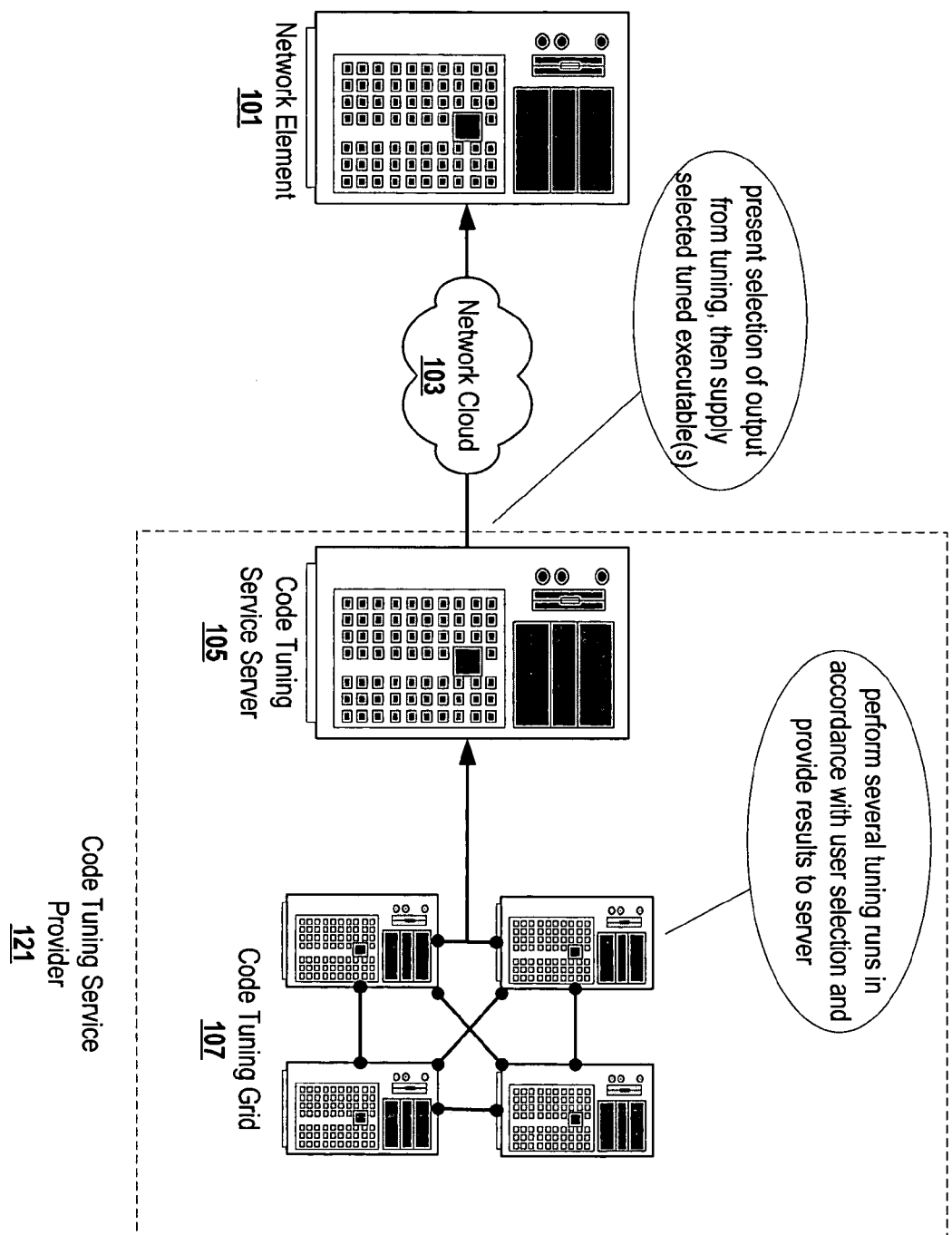

FIGS. 1A-1B depict an example network supporting a web-based tuning service. FIG. 1A depicts an example network carrying code to a code tuning service provider. A code tuning service provider 121 includes a code tuning service server 105 (e.g., a web server) and a code tuning grid 107. Although the code tuning service provider 121 is depicted in FIG. 1A as performing the code tuning service, a code tuning service provider may instead forward supplied code to another entity for the code tuning service. A network element 101 (e.g., gateway, router, server, etc.) transmits non-source code, such as portable executable code, over a network cloud 103 to the code tuning service provider 121. The code tuning service server 105 includes an implementation of a posting facility to receive code (e.g., a module to receive code transmitted over a network, a depository for code to be tuned, etc.). Although the description refers to non-source code, source code may be supplied for tuning. Factors, such as confidentiality complications, may impede exposure of source code and lead to preference of supplying executable representation of the source code. However, information about the building of the executable representation (e.g., linking information, options selected when compiling the source code, etc.) may be necessary for tuning the code. Employing portable executable code satisfies concerns of confidentiality while still conveying information used in tuning code. A portable executable code is an executable representation of source code that includes intermediate representations of the source code. Inclusion of the intermediate representations within the executable representation of the source code allows the intermediate representations of the source code to be maintained in a single executable representation. The intermediate representations can be extracted from the executable representation and recompiled to generate another executable representation, thus facilitating portability without source code. More detailed examples of portable executable code are provided in U.S. application Ser. No. 10/813,889, entitled "Portable Executable Source Code Representations," filed on Mar. 31, 2004, and naming as inventors Raj Prakash, Kurt J. Goebel, and Fu-Hwa Wang, which is incorporated by reference herein in its entirety. Various realizations may utilize other mechanisms for supplying non-source code for tuning, or even supply source code for tuning.

The network element 101 also transmits tuning parameters along with (or subsequent to) the non-source code over the network cloud 103 to the code tuning service provider 121. The tuning parameters include location of the non-source code, commands (e.g., verification commands, run commands, number of delay events, etc.) metrics for measuring a characteristic of the code, level of tuning, etc. Although most metrics measure performance of a code, some metrics, such as file size, may be more adequately classified as a code characteristic measurement, which also includes performance. A code characteristic is used herein to refer to a measurable characteristic of code, which can be used to distinguish one executable representation of code from another. Run commands convey commands for executing executable code generated from the non-source code. The code tuning service uses provided verification commands to verify that a generated executable code produced correct results, allowing those that fail verification to be flagged, perhaps for further examination to determine the cause of the failure. Any number of metrics can be indicated including runtime, various benchmarks, etc. A code tuning service can provide any number of levels of tuning. As the level of tuning increases, more resources are expended in tuning the code.

Figure 2:
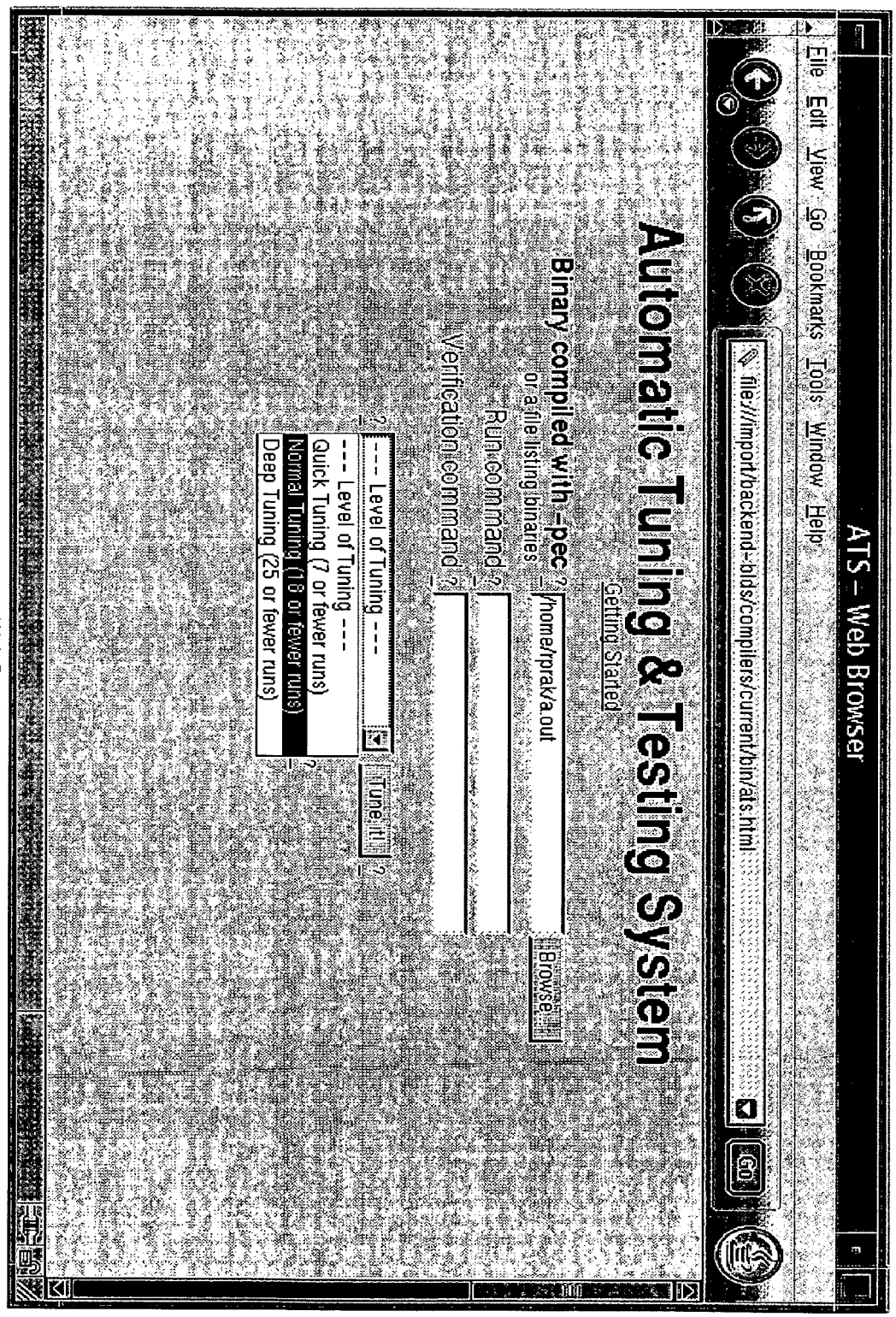
FIG. 2 depicts an exemplary web portal for supplying code for tuning and indicating tuning parameters.

FIG. 2 depicts an exemplary web portal for supplying code for tuning and indicating tuning parameters. The depicted web portal 200 includes four fields: a code location field, a run command field, a verification command field, and a tuning level field. The code location field accepts one or more names (i.e., locations) of files. The command fields accept commands, such as those described above. The level of tuning field is a drop down list that indicates three levels of tuning: quick tuning, normal tuning, and deep tuning. The depicted web portal 200 identifies quick tuning as 7 or fewer runs, normal tuning as 18 or fewer runs, and deep tuning as 25 or more runs. Each run involves compiling with a set of options different than other runs, and hence generation of a different executable code. After a non-developer user or developer user enters input into the fields, selection of a "Tune It" button causes transmission of the file(s) and corresponding input tuning parameters to a code tuning service provider. Although the web portal includes the command fields, tuning of code does not necessarily require information about run commands or verification commands. A user may simply input the name of a file and select the "Tune It" button causing the code tuning service utilize parameters that are predefined parameters, that are later selected, etc.

Those of ordinary skill in the art will appreciate that web portals to display and receive information as described herein can be implemented with any one or combination of the multitude of web portal development techniques. Web portals may be implemented partially or completely with web portal building applications and/or languages, such as HTML, SGML, XML, the Java™ programming language, etc.

FIG. 13 depicts an example web page for a user to enter advanced tuning parameters. A web page 1300 depicted in FIG. 13 includes an example run command "pec.out input.txt>output.txt" in the run command field. This example run command utilizes the file input.txt as input to the pec.out code and causes generation of an output file. There is also an example verification command that indicates "cmp output.txt output.gold". This example verification command will cause the tuning application to compare the two output files and output any indications of differences between the two files. The example user interface presented with the web page 1300 also includes fields for a user to indicate a server name, port, compiler directory, experiment options and actions, extra build options, performance metric command, a timeout field, a field to indicate a stop time, and a field for additional tuning parameters. Actions include options defined for compiling a code, script invocation, environment variable settings, etc. In addition, actions may be provided in a text file, as inserted from output from script, etc. The server name field and port allows a user to indicate a particular server and port to perform the code tuning. A tuning service provider may offer tuning with various levels of machinery and allow users to select the level of machinery for tuning. The compiler directory field allows a user to indicate a particular code development tool to be utilized. For example, a code tuning service provider may possess multiple code development tools with an array of features and capabilities distinct for each code development tool.

The example input for the extra build field is depicted in FIG. 13 as "-lm-xlinkopt". A check box labeled as "Link libraries automatically" accompanies the extra build options field. Similarly, a checkbox labeled "Lower metric is better" accompanies the "Performance metric command" field. The "Application timeout in seconds" field is accompanied by selectable input for an exit code assignment for the timeout. The selections include a zero for pass and one for fail upon timeout. The stop time field labeled "Stop on" allows as user to indicate an amount of time to allow code being tuned to continue running before terminating execution. Checkboxes "Dryrun" and "debug" accompany the "Stop on" field. These checkboxes allow a user to indicate whether the code being tuned is to be executed as a dry run and/or as a debug. For example, selecting "Dryrun" causes presentation of one or more command line commands for tuning code, but does not actually tune the code, while selection of the "debug" causes tunes the code and supplies debug information about the tuning runs.

Referring again to FIG. 1A, the non-source code and tuning parameters submitted by a user from the network element 101 is received by the code tuning service server 105. The code tuning service server 105 invokes tuning of the received non-source code by the code tuning grid 107. Functionality for providing the code tuning service may be installed on the code tuning service server 105 (e.g., as a cgi script), on a different private server, etc.

FIG. 1B depicts an exemplary system with a grid to tune code. The code submitted by a user along with desired tuning level and any other submitted tuning parameters are forwarded to one of the machines in the tuning grid 107. The code tuning grid 107 is a networked group of machines that cooperatively operate to tune code. Obviously, a code tuning service is not limited to tuning code with a grid. For example, the code tuning service server 105 may tune code (e.g., a cgi script installed on the code tuning service server), the code tuning service server 105 may select a server from a server farm to tune the code, etc. A tuning application at one of the machines of the grid 107 receives the supplied code and corresponding parameters. The application invokes a code development tool (e.g., a compiler) to generate executable code with various options.

A code tuning service may employ an application that automatically tunes code, may tune code with personnel, or use both personnel and an automatic code tuning application. Personnel familiar with the code development tool will use the code development tool and their knowledge of its features and capabilities to generate several executable codes, depending upon the level of tuning selected by the user. If automatic tuning is performed, then the automatic tuning application invokes the code development tool several times with different features selected to generate several executable codes, again as dictated by the level of tuning selected by the user. A web-based tuning service may use both an automatic tuning application and personnel to tailor a code development environment for each code unit or set of code units. After initial tuning by the automatic tuning application, personnel may examine the results and determine whether the code can be further tuned. For this illustration, it is assumed that the code is being tuned with an automatic code tuning application.

After tuning, the tuning grid 107 provides the results to the tuning service server 105. Either the results are provided for presentation over the web, or the web service server 107 prepares the provided results for presentation over the web. For example, the tuning grid 107 generates data that includes metrics and file locations, and perhaps selected code development tool options. The code tuning service server 105 accepts the data and generates a corresponding web page that presents the results and links the results to the respective executable code.

Figure 3:
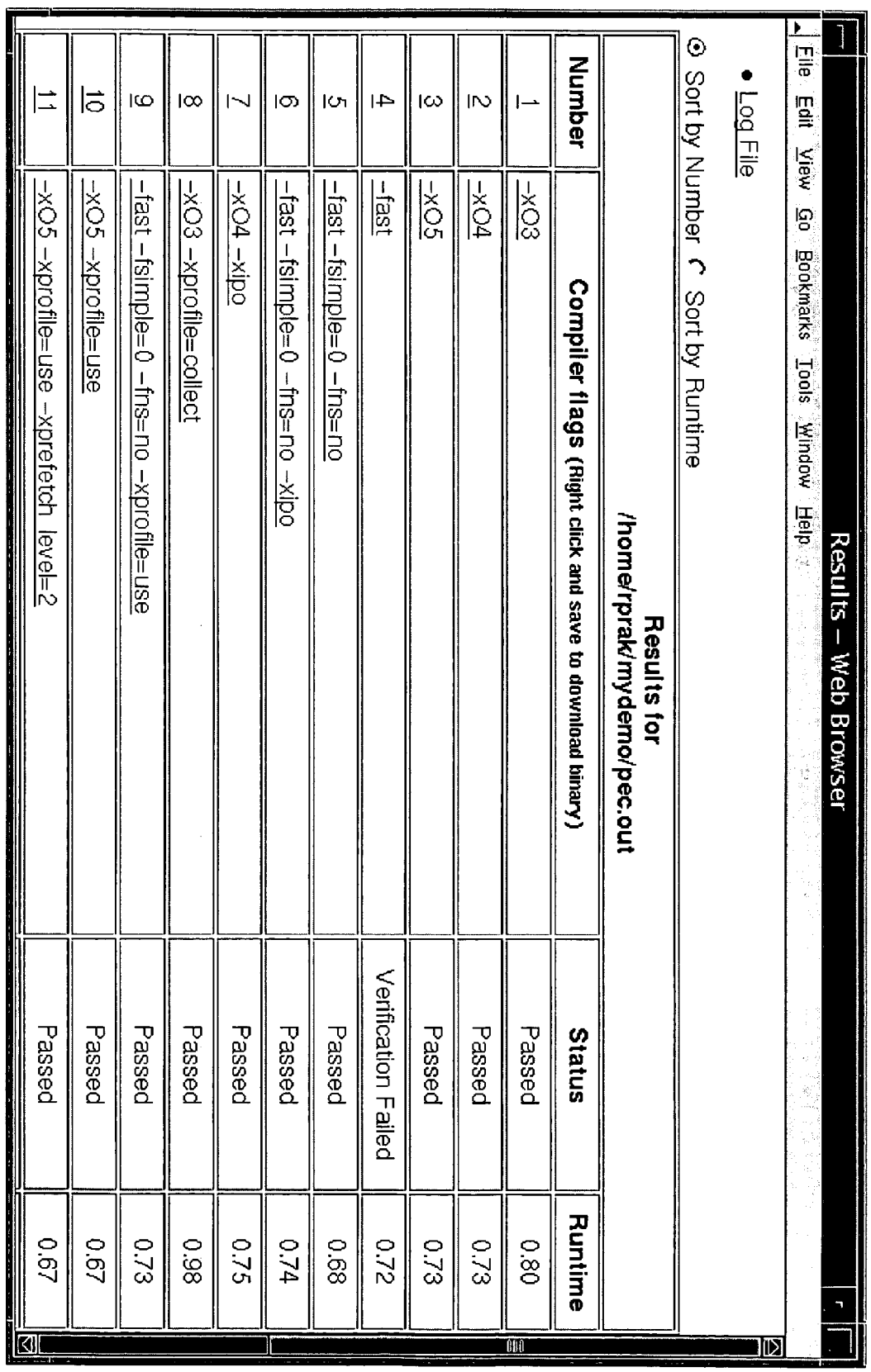
FIG. 3 depicts an example of a web portal presentation of results of tuning.

FIG. 3 depicts an example of a web portal presentation of results of tuning. A web page 300 includes an entry for each result of the tuning. Each entry indicates a number for the entry, compiler flags selected to generate the corresponding executable code, verification status, and runtime. The web page 300 allows the presented results to be sorted by number or by runtime. Although FIG. 3 only depicts a single metric, it should be appreciated that multiple metrics can be used for sorting results, as well as used for tuning code. In addition, a user may retrieve different tuned executable codes based on different metrics. In FIG. 3, a user downloads a particular tuned executable code by right clicking on the link that indicates selected compiler flags and saving down the linked tuned executable code. Those of ordinary skill in the art will appreciate that various mechanisms can be employed for retrieval of tuned executable code (e.g., command line invocation of a file transfer protocol application, automatic delivery of all tuned executable codes, etc.).

FIG. 12 depicts an example web page for presenting multiple metrics. In FIG. 12, a web page 1200 presents for each tuning run compiler options, verification status, a time metric, and size of the generated executable code. Although the example web page 1200 only depicts sorting by row number or time, those of ordinary skill in the art will appreciate that the data may be sorted by other metrics, such as the size of files depicted in FIG. 12. A user may select a particular one or more executables codes for retrieval based on both time and size, depending upon which metric is preferred by the user.

Referring again to FIG. 1B, the code tuning service server 104 transmits the results for presentation of the tuning output at the network element 101 via the network cloud, although the results may be transmitted to a different destination if so desired. In FIG. 1B, one or more of the tuned executables are supplied to the network element 101 in response to one or more selections by the user at the network element 101.

Both developer users and non-developer users can take advantage of a web-based code tuning service to benefit from the abundance of capabilities available in code development tools. Concentrating knowledge and familiarity of these capabilities into a web-based code tuning service recovers the benefits offered from these capabilities previously lost due to their overwhelming abundance and complexity. These recovered benefits allow each tuned code to utilize capabilities beneficial to code on an individual basis. The benefit to code offered by a web-based tuning service impacts code development, delivery and maintenance by introducing a new stage in the life cycle of code. After initial development and testing, a web-based code tuning service can tune the code prior to delivery. After delivery, a user of the code may request additional tuning to target that user's needs, address third-party modifications or additions to the code, take advantage of new capabilities of the code development tool, request a higher level of tuning, etc. A tuning service also affects maintenance since maintenance additions or modifications to the code may be tuned by a web-based tuning service separately and/or in conjunction with the original code.

Automatic Tuning System

As already stated above, a web-based tuning service may utilize personnel, an automatic tuning system, or both personnel and an automatic tuning system. An automatic tuning system may be implemented as a single application on a single machine, a distributed system, an open extensible system, etc. Regardless of the specific implementation, an automatic tuning system initially generates executable code from one or more runs with various code development tool options, and intelligently selects additional and/or alternative options based on runtime feedback of the initially generated executable code.

Figure 4:
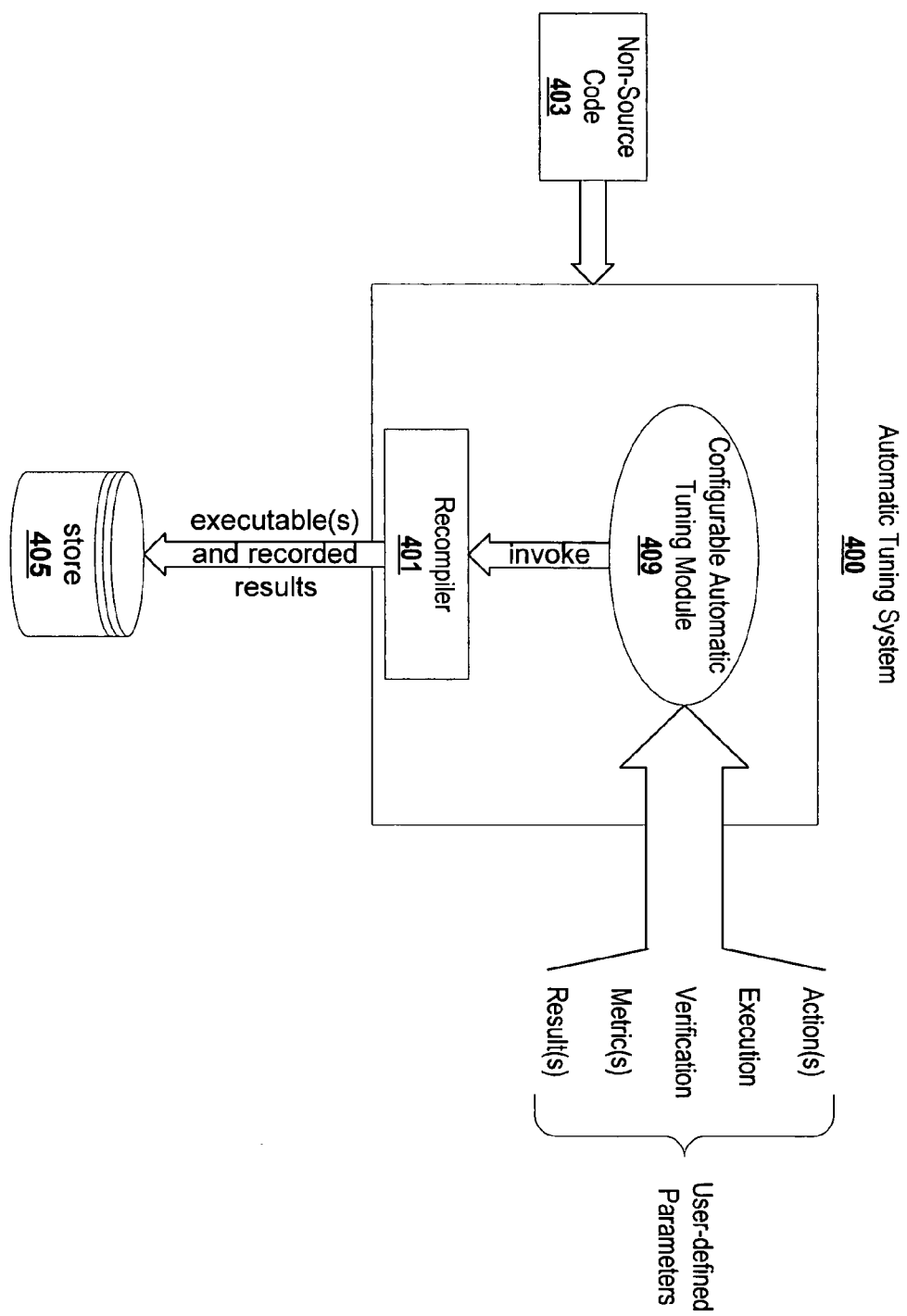
FIG. 4 depicts an example automatic tuning system as an extensible system.

FIG. 4 depicts an example automatic tuning system as an extensible system. In FIG. 4, an automatic tuning system 400 includes a recompiler 401 and a configurable automatic tuning module 409. As an extensible system, the automatic tuning system 400 operates in accordance with certain user-defined parameters, which configure the configurable automatic tuning module 409. Some or all of these parameters may be provided by the user requesting tuning of code (e.g., the tuning parameters supplied via a web portal). Those parameters that are not provided by the user requesting tuning are provided by personnel tuning the code as default parameters, parameters for individual codes, parameters for categories of code, etc. In FIG. 4, these parameters include user-defined actions, user-defined execution (i.e., run commands), user-defined verification (i.e., verification commands), user-defined metrics, and user-defined location for results. For example, a user may provide define a file or directory for results to be deposited. The automatic tuning system accesses the results (e.g., as a link to a file, a link to directory, etc.) for presentation of the results, loading of the results for a particular run, etc. The automatic tuning system 400 accepts these parameters, and the configurable automatic tuning module 409 operates on a received non-source code 403 accordingly. For example, the automatic tuning system 400 initiates processing of a received code according to user-defined actions, such as a script that invokes the recompiler 401, that are executed by the configurable automatic tuning system module 409. Of course, it should be understood that the automatic tuning system 400 may not include a recompiler as a component, and instead, may invoke a code development tool that is separate from the automatic tuning system 400 (e.g., compiler) according to the user-defined action(s). The configurable automatic tuning module 409 invokes the recompiler 401 in accordance with the user-defined parameters, and has the generated executables stored in a store 405, along with recorded metric values (i.e., measurements gathered in accordance with the metric indicated in the tuning parameters). The recorded results may include other values (e.g., performance measurements collected in accordance with a user-defined action).

Figure 5:
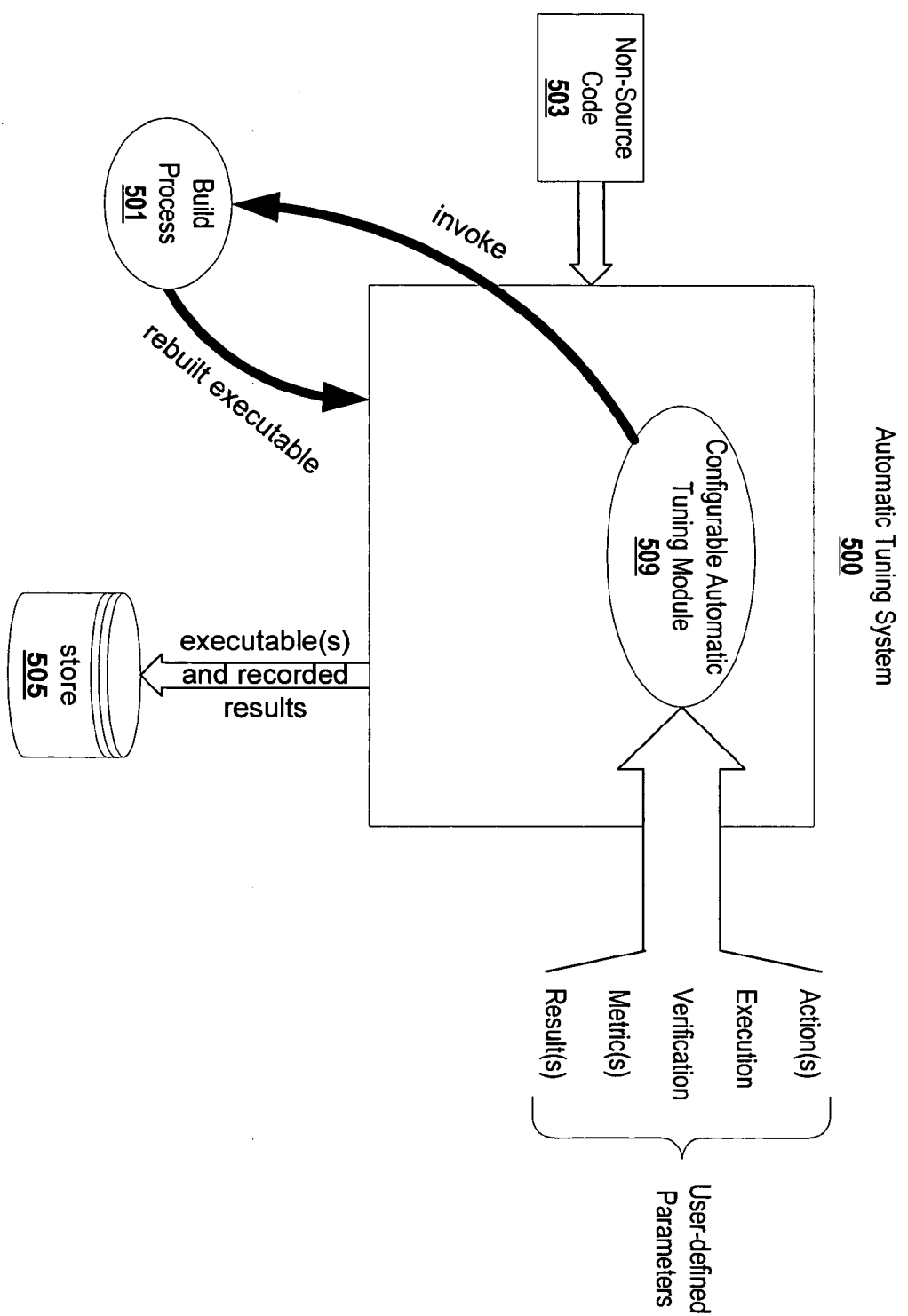
FIG. 5 depicts an example automatic tuning system and a separate compiler.

FIG. 5 depicts an example automatic tuning system and a separate compiler. In FIG. 5, an automatic tuning system 500 includes a configurable automatic tuning module 509. The automatic tuning system 500 receives a non-source code 501 and user-defined parameters, as in FIG. 4. However, the configurable automatic tuning module 509 repeatedly invokes a build process 501 that is external to the automatic tuning system 500. Each time the build process 501 is invoked, a built or rebuilt executable is transmitted back to the automatic tuning system 500. The automatic tuning system 500 executes each received executable and records metric values in accordance with the metric indicated in the user-defined parameters, and perhaps invokes a profiler, which may or may not be external to the automatic tuning system 500, to collect additional runtime feedback if so indicated in the user-defined parameters. Hence, FIG. 5 illustrates that the automatic tuning system 500 can administer application runs and feedback on local or remote systems as configured. For example, the build process 501 may be on a system local to the automatic tuning system 500, or remote from a system that hosts the automatic tuning system 500.

Figure 6:
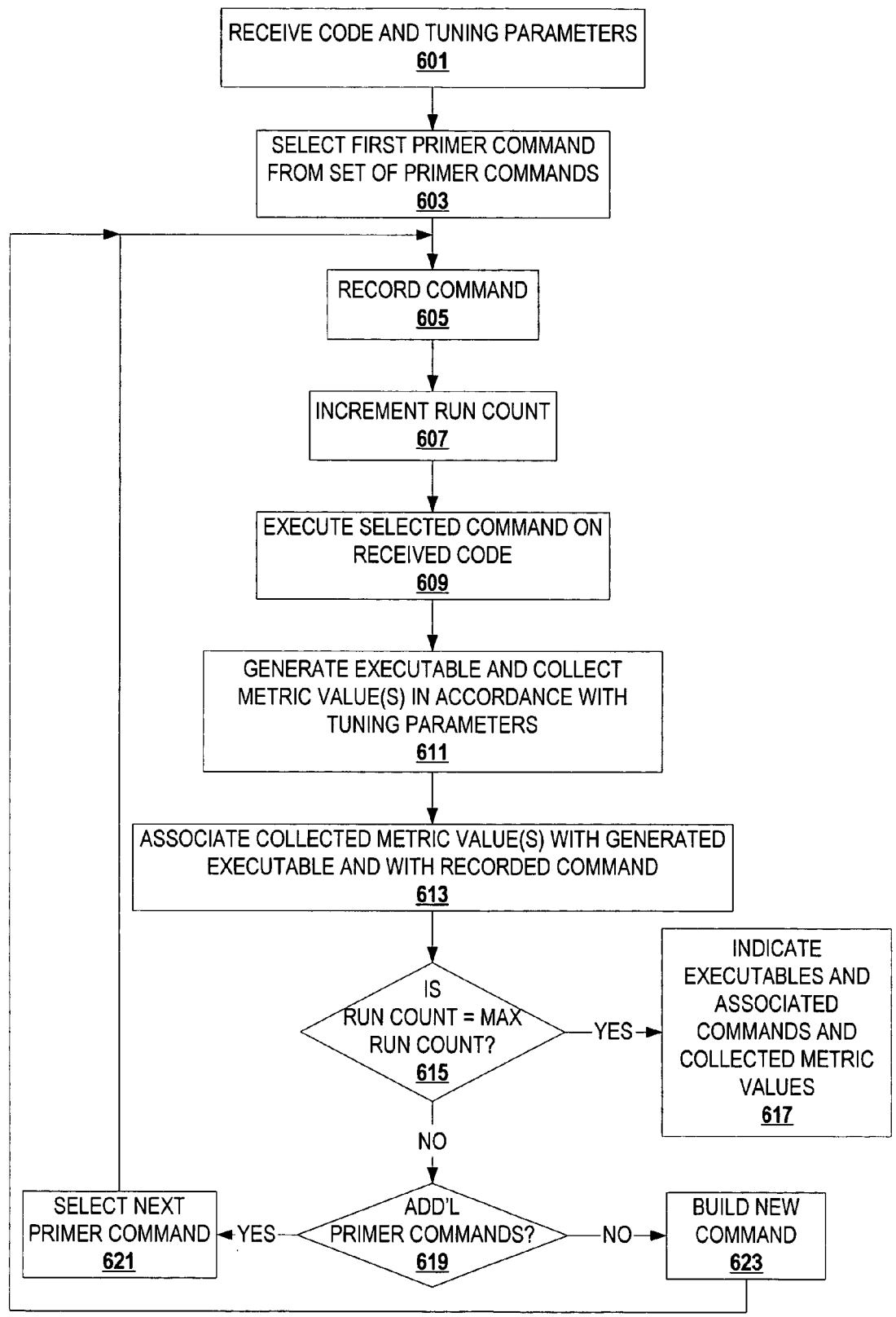
FIG. 6 depicts an example flowchart for tuning code. At block 601, code and tuning parameters are received.

FIG. 6 depicts an example flowchart for tuning code. At block 601, code and tuning parameters are received. At block 603, a first primer command is selected from a set of primer commands. The primer commands are those commands initially used to compile a code (e.g., a code tuning engineer has defined a set of commands deemed generally beneficial for at least most codes). At block 605, the command to be executed is recorded. At block 607, a run count is incremented. Of course, the run count is assumed to begin from a base value, such as zero. At block 609, the selected command is executed on the received code. At block 611, an executable is generated and one or more metric values for the generated executable are collected in accordance with the received tuning parameters. At block 613, the collected metric value(s) and the generated executable are associated with each other, as well as with the recorded command. At block 615, it is determined whether the run count is equal to a boundary value, such as max run count. If the run count is equal to max run count, then control flows to block 617. If the run count is not equal to the max run count, then control flows to block 619.

At block 617, generated executables and associated commands and collected metric values are indicated. For example, selectable indications (e.g., hyperlinks) for the generated executables and the associated commands and, perhaps, collected metric values, are transmitted to another machine for packaging or formatting so that the information can be presented to a user. In another example, the machine generating the executable codes also hosts a module that prepares the information for presentation via a web portal, such as a web browser.

At block 619, it is determined whether there are additional primer commands. If there are additional primer commands, then control flows to block 621. If there are not additional primer commands, then control flows to block 623.

At block 623, a new command is built. The automatic tuning system examines the collected metric values, and builds a command using examination of the collected metric values from previous runs.

At block 621, a next primer command is selected. Control flows from both blocks 623 and 621 back to block 605.

Although the above example depictions store generated executables, the generated executables may only be stored temporarily and then discarded. Instead of maintaining two versions of executable codes (a version instrumented for collection of runtime feedback and a version for delivery to a user), the instrumented generated executables are stored temporarily and then discarded (e.g., discarded immediately after their run, after a time period, after a given number of runs, etc.). In response to a user selecting a run (i.e., selecting the executed command with the performance results desired by the user), the code tuning service executes the command again to generate a non-instrumented executable code and delivers this generated executable code.

The following is an example script for automatically tuning code.

```
if ($level > 0) {
    print "-xO3\n";
    print "-xO4\n";
    print "-xO5\n";
    print "-fast\n";
    conditional('$ATS_LAST_STATUS != 0',
    '-fast -fsimple=0 -fns+no');
    print "best2+ -xipo\n"
}
```

-continued

```
if ($level > 1) {
    print "-xO3 -xprofile=collect\n";
    print "best2+ -xprofile+use\n";
    print "best2+ -xprefetch_level=2;-xprefetch_level=3\n";
    print "best2+ -xlinkopt+2\n";
    print "best2+ -xpagesize=64K\n";
}
if ($level > 2) {
    print "best2+ -xrestrict\n";
    print "best2+ cc(-xalias_level=strong)\n";
}
```

As can be seen from the example code, the level of tuning controls which section of script is executed. If level 3 was input into the automatic tuning system, then all of the commands in this example script are printed to a command line interface and then executed. If level 2 was input, then only the commands up to the last two commands are executed. It should be understood that the above is only an example to aid in understanding the described invention, and not mean to be limiting upon the described invention.

The automatic tuning of code presented in FIG. 6 may be performed with various techniques. The automatic tuning may be performed on a single system with a single code development tool, a single system with multiple code development tools, a single system with a single code development tool but with multiple threaded support, multiple systems, etc. Embodiments may tune code serially, in parallel, partially in parallel, etc. In addition, various techniques may be implemented to judiciously adapt dispatching of tasks throughout a system to the current load conditions of the system. For example, an automatic tuning system may utilize task queue monitoring for dynamic adaptive parallel computing to dispatch multiple compile tasks (e.g., compile commands to be executed) for processing units of a system.

Task Queue Monitoring for Dynamic Adaptive Parallel Computing

To reap the benefits of a system with multiple processing units (e.g., cores, central processing units, co-processors, etc.) without overloading or underutilizing the system, information about current queued pending or ready tasks are monitored against a system wide task threshold. The system wide task threshold represents a boundary between conditions for optimal resource utilization over a system and conditions for overload of the system. Of course, the system wide task threshold may be configured to represent a boundary that is below optimal resource utilization, slightly above optimal resource utilization, etc. In addition, the "optimal resource utilization" for a system may vary within a range, differ between system administrators, etc. Regardless of what "optimal resource utilization" may be for particular systems, monitoring system wide against a system wide task threshold allows throttling of task dispatch to the system for dynamic adaptation of parallel computing to current conditions of the system.

Figure 7A:
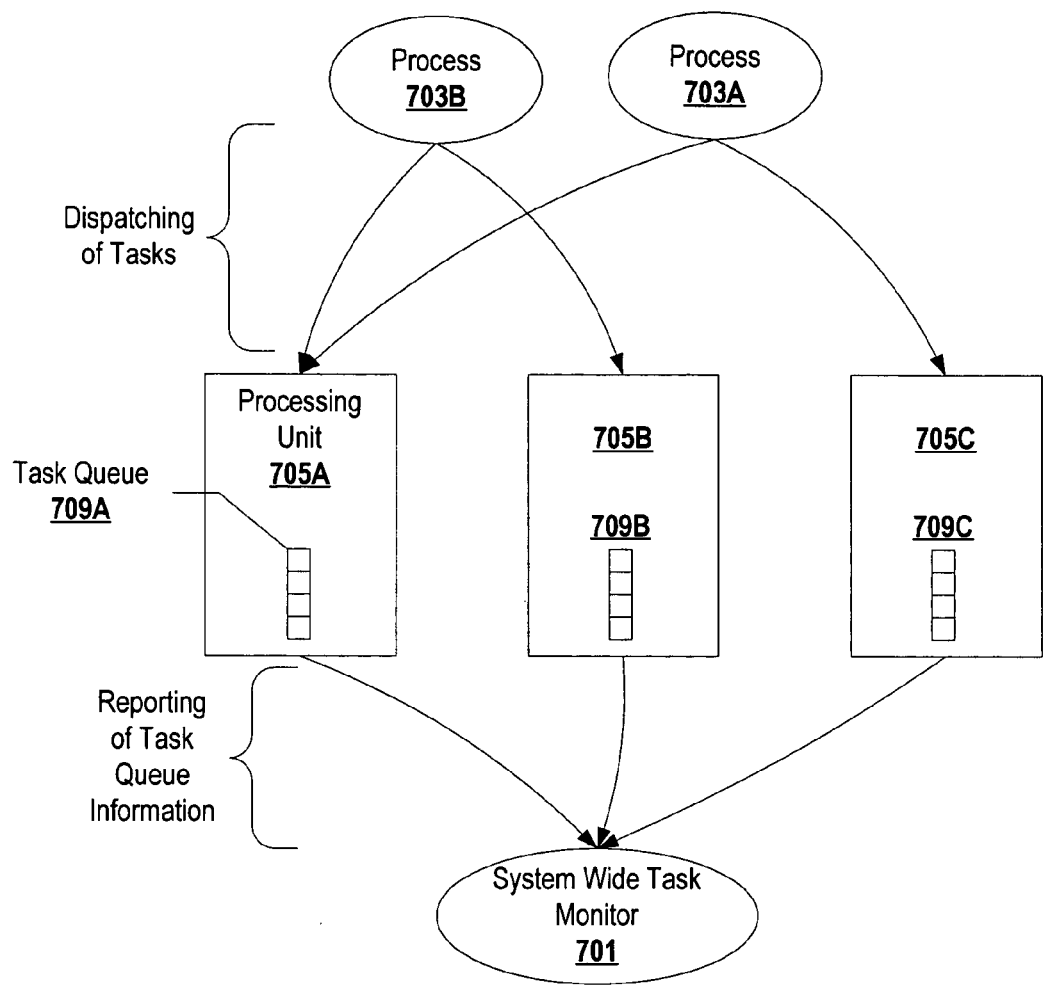
FIGS. 7A-7B depict an example technique for adjusting task dispatch to current conditions of a system.
Figure 7B:
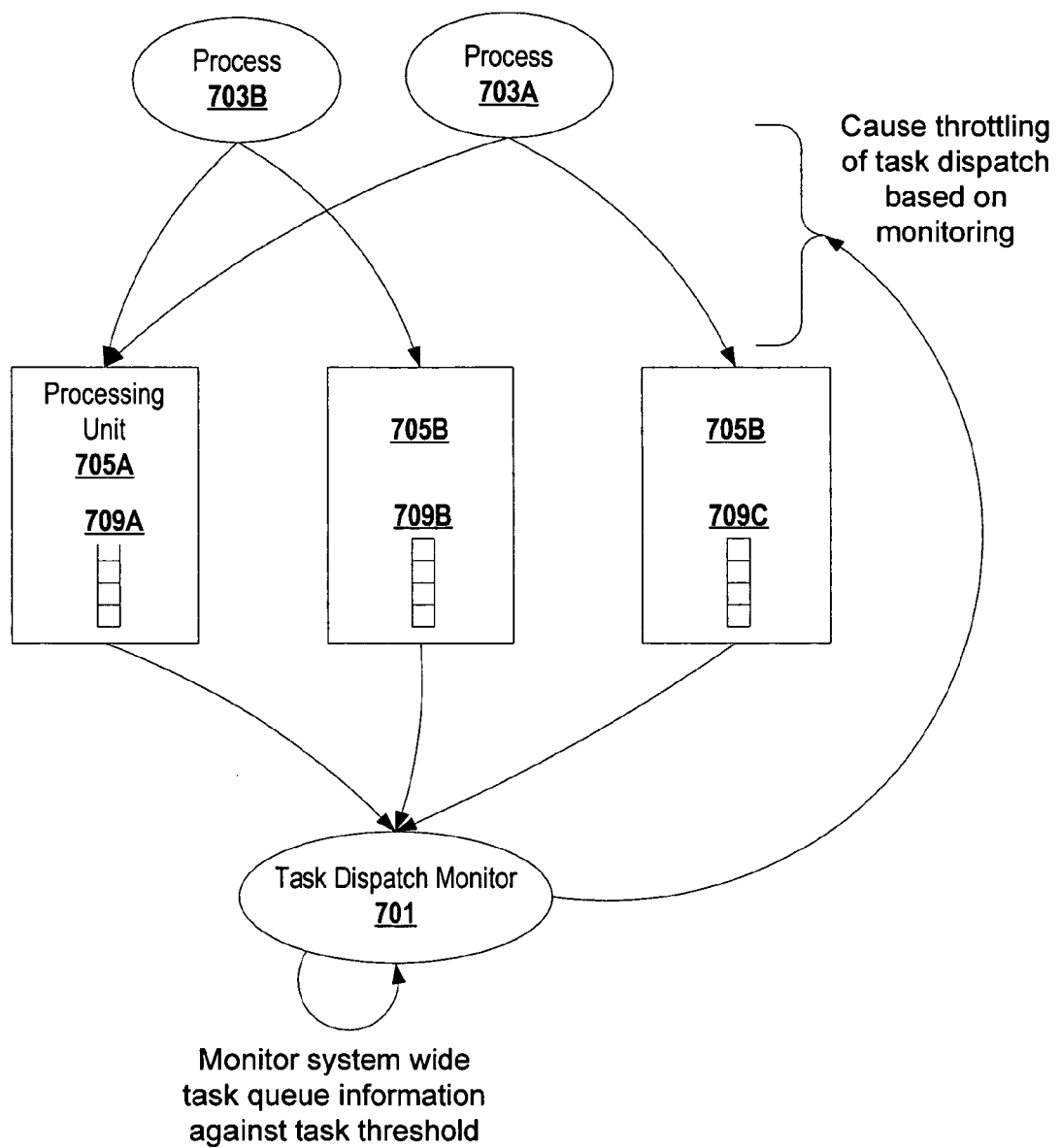

FIGS. 7A-7B depict an example technique for adjusting task dispatch to current conditions of a system. FIG. 7A depicts an example mechanism for monitoring system wide task information. A system includes processing units 705A-705C. Processes 703A and 703B dispatch tasks to the system, which includes the processing units 705A-705C. Processes may be individual applications, components of applications, daemons, etc. Although the processes 703A and 703B are depicted as external to the processing units 705A-705C, theses processes 703A-703B may be hosted by any one or more of the processing units 705A-705C, another processing unit of the system, one or more processing units of another system, etc. The process 703A dispatches tasks to processing units 705A and 705C. The process 703B dispatches tasks to processing units 705A and 705B. Each of the processing units 705A-705C respectively maintains task queues 709A-709C (e.g., kernel job queues). Those of ordinary skill in the art will appreciate that various techniques are available to track tasks dispatched to a system as well as dequeueing and criteria for selecting tasks from the queue. For example, a central set of one or more structures can be maintained by less than all of the processing units of the system for all of the processing units of the system; each processing unit can be responsible for maintaining its own set of one or more structures as depicted in FIGS. 7A-7B; etc. For the example depicted in FIG. 7A, each of the processing units 705A-705C enqueues a task dispatched to it. Dequeuing of tasks may be done in response to initiation of an execution sequence to perform the task or upon completion of a task.

Regardless of the exact technique or mechanism for maintaining task information, the task information is communicated to a system wide task monitor 701. In FIG. 7A, each of the processing units 705A-705C reports their task information to the system wide task monitor 701. The system wide task monitor 701 may be implemented one of the processing units 705A-705C, another processing unit of the system, a different system, etc.

FIG. 7B depicts an example of the system wide task monitor 701 causing throttling of task dispatch to the system. In FIG. 7B, the system wide task monitor 701 monitors the reported system wide task queue information against a task threshold. If that threshold is exceeded (or equaled depending on implementation), then the system wide task monitor 701 causes throttling of task dispatch from the processes 703A-703B to the system.

Figure 8:
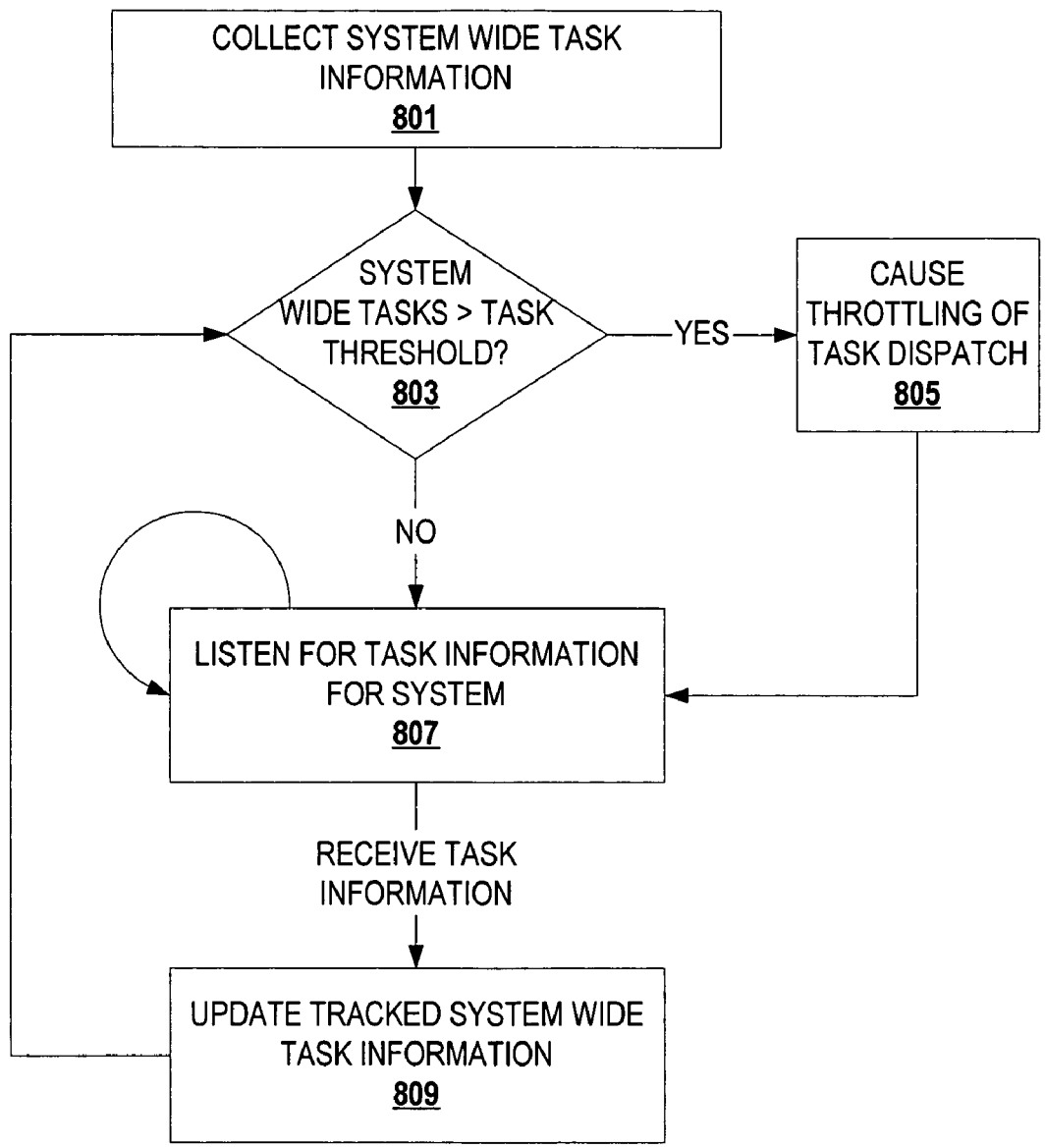
FIG. 8 depicts an example flowchart for a monitor to cause throttling of task dispatch to a system.

FIG. 8 depicts an example flowchart for a monitor to cause throttling of task dispatch to a system. At block 801, system wide task information is collected. At block 803, it is determined whether system wide tasks exceed a task threshold. For example, if the task threshold is 2 times the number of processing units, then a task monitor determines whether total system wide enqueued tasks is greater than the threshold number of tasks. So, if the system includes 5 processing units and 11 tasks are currently enqueued in the system, then the task threshold has been exceeded. Obviously, various metrics can be used for measuring conditions of a system in addition or instead of number of tasks, such as utilization of the processing units, memory consumed, number of stalls, etc. However, the examples utilize number of tasks to aid in understanding the described embodiments instead of obfuscating the described embodiments. If the system wide tasks exceed the task threshold, then control flows to block 805. If the system wide tasks do not exceed the task threshold, then control flows to block 807.

At block 805, throttling of task dispatch is caused. Throttling of task dispatch can be performed with various techniques. For example, a system wide task monitor prevents processes from dispatching tasks for a given period of time; a system wide task monitor prevents all processes from dispatching more than a given number of tasks within a given time period; a system wide task monitor limits task dispatch to a single task per a given time period or tasks dequeued, etc. Processes may be limited to dispatching a single task for each task dequeued. The responsibility for the throttling can be implemented in the individual processes, in an application programming interface, in the system wide task monitor, etc. For example, prior to task dispatch, each process checks a store location for a flag. The system wide task monitor sets the flag to a triggering value if throttling should be imposed and resets the flag to a default value if throttling should not be performed. In another example, tasks are dispatched to the system wide task monitor. If the task threshold is not exceeded, then the tasks are forwarded to the processing units. If the task threshold is exceeded, then tasks are delayed at the task monitor. Control flows from block 805 to block 807.

At block 807, task information for the system is listened for. Upon receiving task information, the tracked system wide task information is updated to reflect current tasks imposed on the system. Control flows from block 809 back to block 803.

Monitoring task load on a system prevents a code tuning system from overloading the system, while allowing the code tuning system to optimally utilize the system. For example, an automatic tuning system may have 7 predefined primer commands. The automatic tuning system dispatches compile tasks for each of the predefined primer commands. If a system is constrained with the example task threshold discussed above and the system includes 3 processing units, then the automatic tuning system can dispatch 6 of the first 7 compile tasks to the system before throttling is imposed. Hence, the dispatching of compile tasks from the automatic tuning system can properly utilize the system without overloading the system and dynamically adapt or be dynamically adapted to conditions on the system, which may vary from tasks dispatched by other applications, changes in operating characteristics, complexity of various compile tasks, etc.

Automatic Intelligent Building of Commands

Whether or not compiler tasks for tuning code are dispatched to a system with multiple processing units or the compiler tasks for tuning code are assigned to a single processing unit, the automatic tuning system builds new commands for compiling code, which result in new tasks to be dispatched. To build new commands, the automatic tuning system examines the runtime feedback of code generated from previously executed commands. The automatic tuning system then builds a new command from the compiler options of the previous commands based on the examined runtime feedback.

Figure 9A:
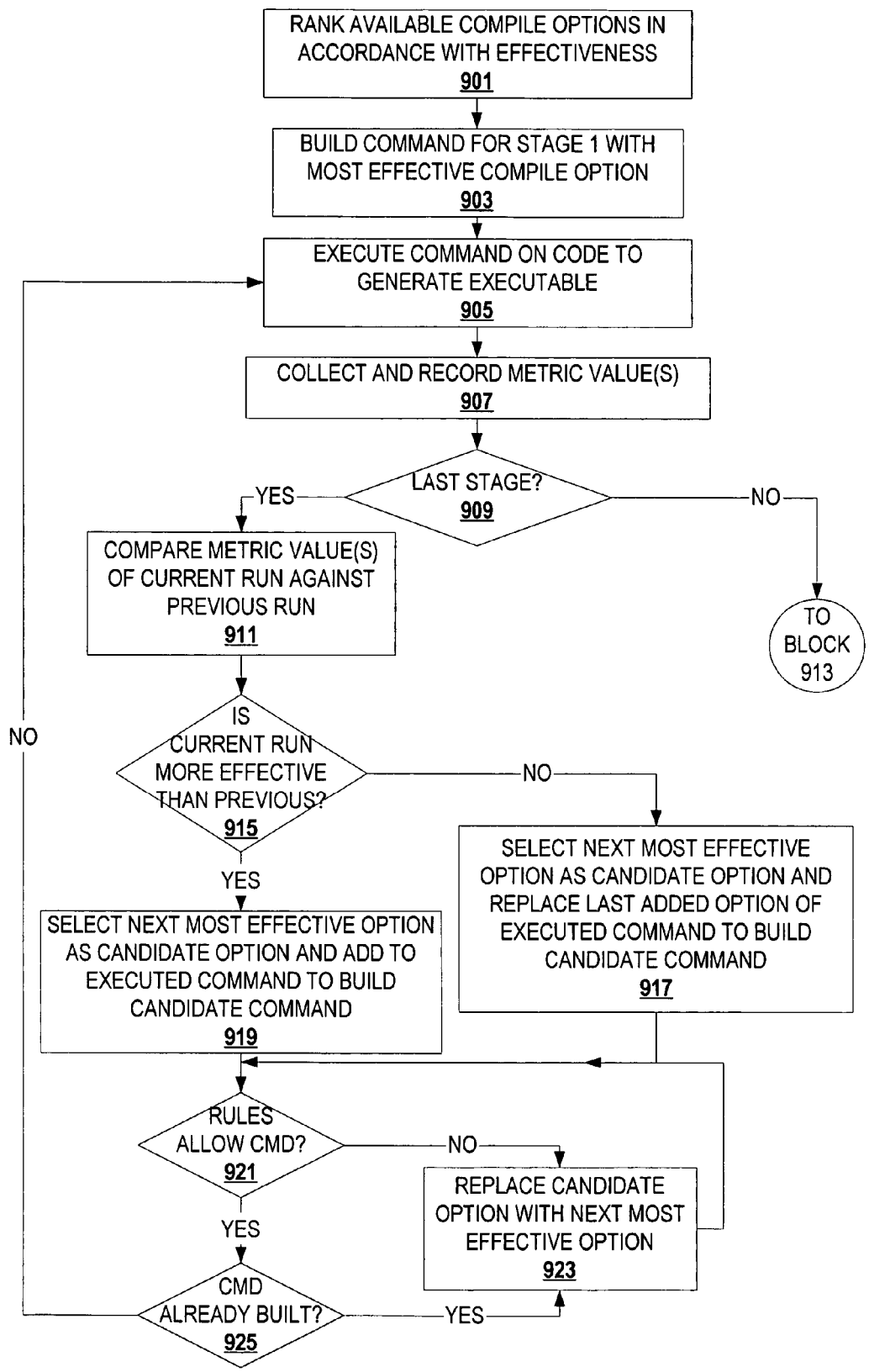
FIGS. 9A-9B depict an example flowchart for automatically intelligently building progressively more efficient commands.
Figure 9B:
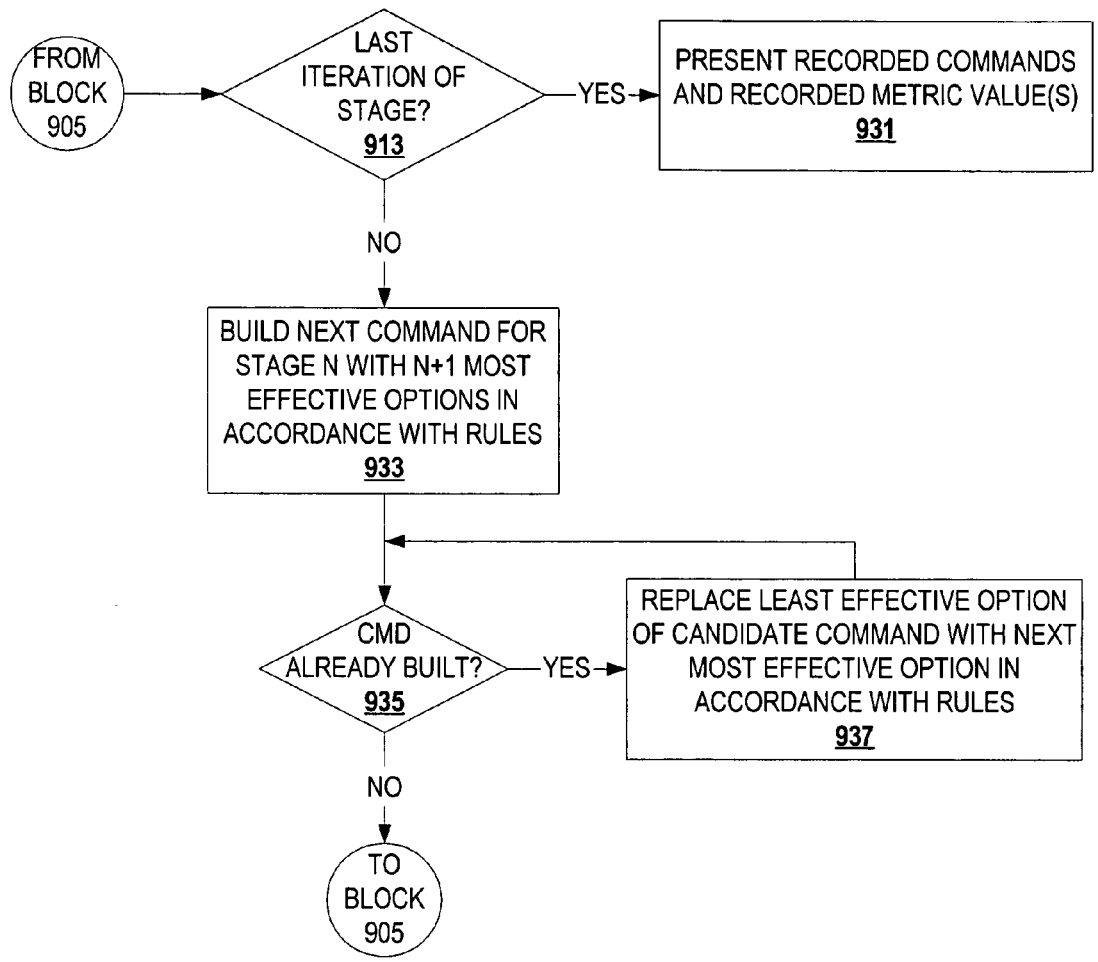

FIGS. 9A-9B depict an example flowchart for automatically intelligently building progressively more efficient commands. FIG. 9A depicts an example flowchart for automatically intelligently building progressively more efficient commands. At block 901, available compile options are ranked in accordance with effectiveness. At block 903, a command is built for stage 1 with the most effective compile option. At block 905, the built command is executed on code to generate an executable. At block 907, one or more metric values (e.g., from runtime feedback) for the executable is collected and recorded. At block 909, it is determined whether the code is in the last stage of command building. If the automatic command building is in the last stage of command building, then control flows to block 911. If the automatic command building is not in the last stage of command building, then control flows to block 913.

At block 911, the metric value(s) of the current run is compared against the metric value(s) of the previous run. At block 915, it is determined which of the current run and the previous run is more effective according to the comparison of metric values. If the current run is more effective than the previous run, then control flows to block 919. If the current run is not more effective than the previous run, then control flows to block 917.

At block 917, the next most effective option, with respect to those options already occurring in the executed command, is selected as a candidate option and used to replace the last added option of the executed command to build a candidate command. Control flows from block 917 to block 921.

At block 919, the next most effective option, with respect to those options already occurring in the executed command, is selected and added to the executed command as a candidate option to build a candidate command. At block 921, it is determined whether the candidate command is allowed by rules governing commands. For example, certain options may be required to appear in a certain order with respect to each other, some options may conflict with other options, etc. In addition, heuristics for code development tool options may be consulted for command building and/or command verification (e.g., re-ordering options of a command, replacing an option of a command in accordance with heuristics, etc.). If the candidate command is permitted by the rules, then control flows to block 925. If the candidate command violates the rules, then control flows to block 923.

At block 923, the candidate command is replaced with a next most effective option, with respect to the candidate option. Control flows from block 923 back to block 921.

At block 925, it is determined whether the candidate command has previously been built. If the candidate command has already been built, then control flows to block 923. If the candidate command has not already been built, then control flows to block 905.

FIG. 9B depicts an example flowchart continuing from FIG. 9A. At block 913, it is determined whether the current stage of automatic command building is the last stage. If the current stage is the last stage, then control flows to block 931. If the stage is not the last stage, then control flows to block 933

At block 935 the recorded commands and recorded runtime feedback are presented. For example, a representation of the recorded information transmitted to a web server for display to a user.

At block 933 a candidate command is built for stage N with the N+1 most effective options in accordance with the rules for command building. At block 935, it is determined whether the candidate command has been built previously. If the candidate command has previously been built, then control flows to block 937. If the candidate command has not been built previously, then control flows back to block 905. At block 937, the least effective option of the candidate command is replaced with an option that is the next most effective option with respect to the option being replaced.

Figure 10A:
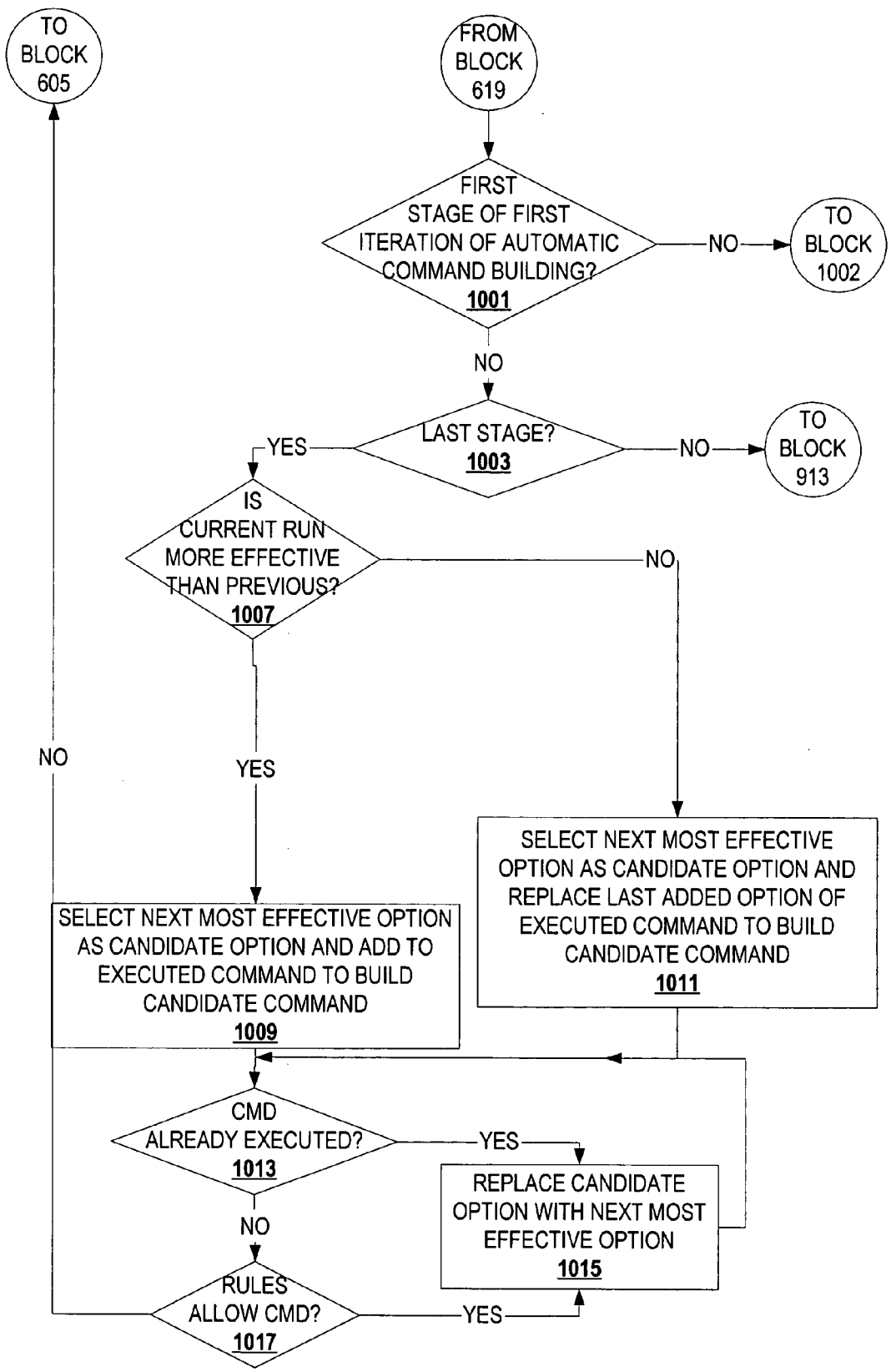
FIGS. 10A-10B depict an example of a flowchart automatically building a command within automatic tuning.
Figure 10B:
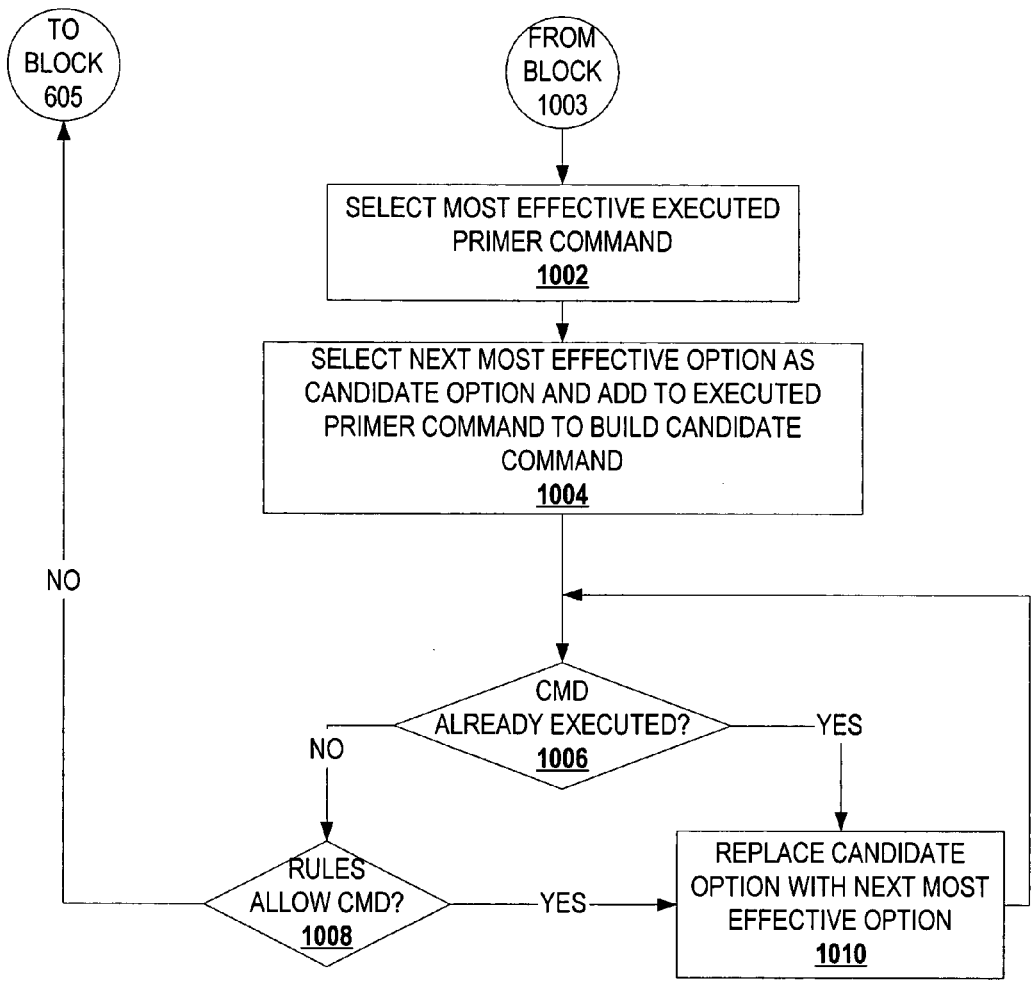

FIGS. 10A-10B depict an example of a flowchart for automatically building a command within automatic tuning. FIG. 10A depicts an example flowchart for integrating automatic command building into automatic tuning with primer commands. FIG. 10 represents block 623 of FIG. 6. Control flows from block 619 to block 1001. At block 1001, it is determined whether the current stage is the first stage of the first iteration of automatic command building. If the current stage is the first stage of the first iteration, then control flows to block 1002. If the current stage is not the first stage of the first iteration, then control flows to block 1003.

At block 1003, it is determined whether the current stage is the last stage of an iteration. If the current stage is the last stage of an iteration, then control flows to block 913. If the current stage is not the last stage of an iteration, then control flows to block 1005.

At block 1007, it is determined whether the current run is more efficient than the previous run (i.e., the runtime feedback of the currently generated executable is compared against the runtime feedback of the previously generated executable). If the current run is more effective than the previous run, then control flows to block 1009. If the current run is not more effective than the previous run, then control flows to block 1011.

At block 1011, the next most effective option, with respect to those options already occurring in the executed command, is selected as a candidate option and used to replace the last added option of the executed command to build a candidate command. Control flows from block 1011 to block 1013.

At block 1009, the next most effective option, with respect to those options already occurring in the executed command, is selected and added to the executed command as a candidate option to build a candidate command. At block 1013, it is determined whether the candidate command has previously been executed. If the candidate command has already been executed, then control flows to block 1015. If the candidate command has not already been executed, then control flows to block 1017.

At block 1017, it is determined whether the candidate command is allowed by rules governing commands. If the candidate command is permitted by the rules, then control flows to block 605. If the candidate command violates the rules, then control flows to block 1015.

At block 1015, the candidate command is replaced with a next most effective option, with respect to the candidate option. Control flows from block 1015 back to block 1013.

FIG. 10B depicts an example continuation of the example flowchart depicted in FIG. 10A. At block 1002, the most effective executed primer command is selected. At block 1004, the next most effective option, with respect to the least effective option of the selected command, is selected as a candidate option and added to the executed primer command to build a candidate command. At block 1006, it is determined whether the candidate command has already been executed. If the candidate command has already been executed, then control flows to block 1010. If the command has not already been executed, then control flows to block 1008.

At block 1010, the candidate option is replaced with the next most effective option, with respect to the candidate option. Control flows from block 1010 back to block 1006.

With the automatic intelligent building of progressively more efficient commands, an automatic tuning system can efficiently and judiciously search through the available compile options to find the more effective combinations of options to generate executable codes. With the automatic command building, an automatic tuning system sifts through numerous options and combinations of options in accordance with one or more metrics to measure performance to generate optimized executable codes with substantially more efficiency than manual command building. An automatic tuning system, with or without automatic intelligent command building, can be deployed to various sites allowing code to be posted to local servers or server farms, for code tuning instead of transmitting the code externally. Hence, code tuning would be available locally without external exposure of the code. Furthermore, locally deployed code tuning can be coupled with a code tuning service to provide local tuning of source code and subsequent tuning of delivered executable code that conveys information sufficient for tuning (e.g., portable executable code).

A code tuning service that utilizes an automatic tuning system implementing automatic intelligent progressive command building, perhaps with some input from code tuning engineers, provides a service that facilitates availability of features and capabilities of a code development tool without the substantial cost of educating users about the code development tool. Such a service is also provided with reduced investment of personnel since the variety of numerous option combinations is sifted through automatically. Furthermore, extensibility of the automatic tuning system allows the automatic tuning system to be tailored for particular codes or target machines.

The described invention may be provided as a computer program product, or software, possibly encoded in a machine-readable medium as instructions used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 11:
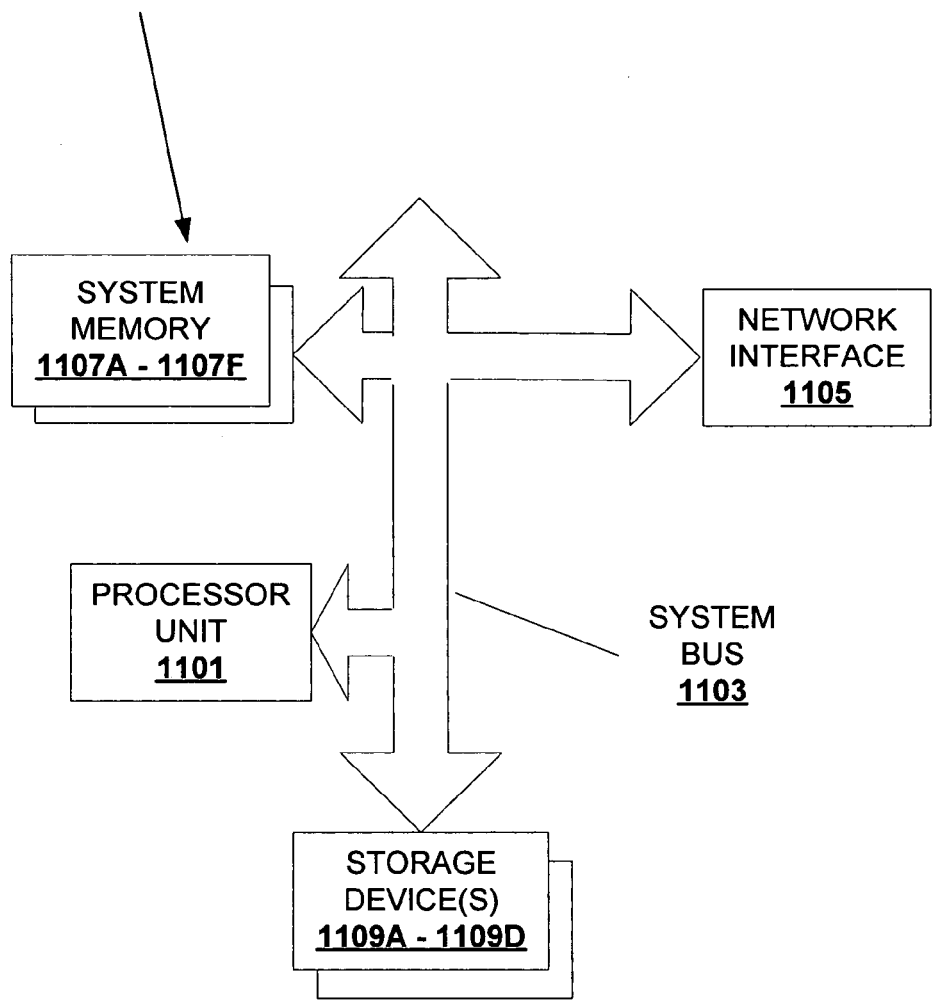
FIG. 11 depicts an exemplary computer system according to some realizations of the invention.

FIG. 11 depicts an exemplary computer system according to some realizations of the invention. A computer system includes a processing unit 1101 (possibly including multiple processors and/or implementing multi-threading). The computer system also includes a machine-readable media 1107A-1107F. The machine-readable media may be system memory (e.g., one or more of cache, SRAM, DRAM, RDRAM, EDO RAM, DDR RAM, EEPROM, etc.) or any one or more of the above already described possible realizations of machine-readable media. The computer system further includes a system bus 1103 (e.g., LDT, PCI, ISA, etc.), a network interface 1105 (e.g., an ATM interface, an Ethernet interface, a Frame Relay interface, etc.), and a storage device(s) 1109A-1109D (e.g., optical storage, magnetic storage, etc.). One or more of the machine-readable media 1107A-1107F embodies a web portal for a code tuning service. Realizations may include fewer or additional components not illustrated in FIG. 11 (e.g., video cards, audio cards, additional network interfaces, peripheral devices, etc.). The processing unit 1101, the storage device(s) 1109A-509D, and the network interface 1105 are coupled to the system bus 1103. The machine-readable media 1107A-1107F is either coupled directly or indirectly to the system bus 1103.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. An automatic tuning system, comprising:
   at least one machine-readable media operable to store instructions;

at least one processing unit, communicably connected to the at least one machine-readable media, operable to execute instructions stored in the at least one machine-readable media, a first set of instructions, stored in the at least one machine-readable media, executable by the at least one processing unit to execute a first subset of a set of code processing commands to generate a first executable code, the first set of instructions executable to collect one or more code characteristic metric values for the first executable code;

a second set of instructions, stored in the at least one machine-readable media, executable by the at least one processing unit to derive a second subset of the set of code processing commands based on the one or more code characteristic metric values for the first executable code, the second set of instructions executable to execute the second subset to generate a second executable code, and the second set of instructions executable to collect one or more code characteristic metric values for the second executable code;

a third set of instructions, stored in the at least one machine-readable media, executable by the at least one processing unit to derive a third subset of the set of code processing commands, unless derivation of the third subset exceeds a user specified number of subset derivations, by:

comparing the one or more code characteristic metric values for the first executable code and the one or more code characteristic metric values for the second executable code;

if the one or more code characteristic metric values for the second executable code exceed the one or more code characteristic metric values for the first executable code, adding a code processing command of the set of code processing commands to the second subset without removing a code processing command from the second subset;

if the one or more code characteristic metric values for the second executable code do not exceed the one or more code characteristic metric values for the first executable code, replacing a code processing command of the second subset with a different code processing command of the set of code processing commands; and a fourth set of instructions, stored in the at least one machine-readable media, executable by the at least one processing unit to execute the third subset to generate a third executable code; and consulting heuristics to select at least one of the added code processing command and the replacement code processing command from the plurality of different code processing commands.

2. The automatic tuning system of claim 1 further comprising a code development tool operable to execute code processing commands.

3. The automatic tuning system of claim 1 further comprising the automatic tuning system being operable to invoke a code development tool to execute a code processing command and operable to receive executable code from the code development tool.

4. The automatic code tuning system of claim 1, wherein the set of code processing commands comprises at least one of compile commands, interpret commands, and optimization commands.

5. The automatic code tuning system of claim 1, wherein at least one of the set of code processing commands is predefined.

6. The automatic tuning system of claim 1, wherein at least one of the set of code processing commands is automatically built.

7. The automatic tuning system of claim 6, further comprising:

a fifth set of instructions, stored in the at least one machine-readable media, executable by the at least one processing unit to rank effectiveness of code processing commends of the set of code processing commands, the effectiveness determined according to at least one of heuristics and predefined indications of effectiveness.

8. The automatic tuning system of claim 1, wherein the set of code processing commands comprises code development tool options.

9. The automatic tuning system of claim 1 further comprising a dynamic profiler.

10. The automatic tuning system of claim 1, wherein a code characteristic metric comprises at least one of file size, execution time, and number of delay events.

11. The automatic tuning system of claim 1, wherein at least one of the generating of executable codes and the collecting of code characteristic metric values is in accordance with at least one of a run command, a verification command, and an experiment option.

12. The automatic tuning system of claim 1, wherein at least two of the set of code processing commands execute in parallel.

13. A method for automatically tuning code comprising:

executing a first subset of a plurality of different code processing commands on a code to generate a first executable code utilizing at least one processing unit;

recording at least one code characteristic metric values for the first executable code in a machine-readable media;

executing a second subset of the plurality of different code processing commands on the code to generate a second executable utilizing the at least one processing unit, the second subset derived based on the at least one code characteristic metric value for the first executable code;

recording at least one code characteristic metric value for the second executable code in the machine-readable media;

deriving a third subset of the plurality of different cods processing commands utilizing the at least one processing unit, unless derivation of the third subset exceeds a user specified number of subset derivations, the plurality of different code processing commands including options of a code development tool, by:

comparing the at least one code characteristic metric value for the first executable code with the at least one code characteristic metric value for the second executable code;

if the at least one code characteristic metric value for the second executable code exceeds the at least one code characteristic metric value for the first executable code, adding a code processing command of the plurality of different code processing commands to the second subset without removing a coda processing command from the second subset;

if the at least one code characteristic metric value for the second executable code do not exceed the at least one code characteristic metric value for the first executable code, replacing a code processing command of the second subset with a different code processing command of the different code processing commands; and executing the third subset of the plurality of different code processing commands on the code to generate a third executable utilizing the at least one processing unit; and consulting heuristics to select at least one of the added code processing command and the replacement code processing command from the plurality of different code processing commands.

14. The method of claim 13 further comprising organizing code processing commands of the plurality of different code processing commands according to effectiveness for optimizing the code.

15. The method of claim 13 further comprising verifying that the third subset of the plurality of different code processing commands do not conflict.

16. The method of claim 13 further comprising extracting the code from within an executable representation of a source code, wherein the code includes an intermediate representation of the source code.

17. A computer program product embodied in one or more machine-readable media, the computer program product comprising:

a first sequence of instructions, stored in at least one machine-readable media, executable by at least one processing unit to accept one or more tuning parameters;

a second sequence of instructions, stored in the at least one machine-readable media, executable by the at least one processing unit to generate a first executable code by executing a first subset of a plurality of different code processing commands on a code in accordance with the one or more tuning parameters, the second sequence of instructions executable to record at least one code characteristic metric value for the first executable code;

a third sequence of instructions, stored in the at least one machine-readable media, executable by the at least one processing unit to generate a second executable code by executing a second subset of the plurality of different code processing commands on the code in accordance with the one or more tuning parameters, the third sequence of instructions executable to record at least one code characteristic metric value for the second executable code, the second subset of the plurality of different code processing commands derived based on the at least one code characteristic metric value for the first executable code;

a fourth sequence of instructions, stored in the at least one machine-readable media, executable by the at least one processing unit to derive a third subset of the plurality of different code processing commands, unless derivation of the third subset exceeds a user specified number of subset derivations, by:

comparing the at least one code characteristic metric value for the first executable code with the at least one code characteristic metric value for the second executable code;

if the at least one code characteristic metric value for the second executable code exceeds the at least one code characteristic metric value for the first executable code, adding a code processing command of the plurality of different code processing commands to the second subset without removing a code processing command from the second subset; and if the at least one code characteristic metric value for the second executable code does not exceed the at least one code characteristic metric value for the first executable code, replacing a code processing command of the second subset with a different code processing command of the plurality of different code processing commands;

a fifth sequence of instructions, stored in the at least one machine-readable media, executable by the at least one processing unit to generate a third executable code by executing the third subset of the plurality of different code processing commands on the code in accordance with the one or more tuning parameters; and a sixth sequence of instructions, stored in the at least one machine-readable media, executable by the at least one processing unit, to consult heuristics to select at least on of the added code processing command and the replacement code processing command from the plurality of different code processing commands.

18. The computer program product of claim 17, wherein at least one of the plurality of different code processing commands is predefined.

19. The computer program product of claim 17, wherein the plurality of different code processing commands are ranked to indicate effectiveness.

20. The computer program product of claim 17, wherein the one or more tuning parameters comprise at least one of compile options and optimization flags.

* * * * *

UNITED STATES PATENT AND TRADEMARK OFFICE
CERTIFICATE OF CORRECTION

| | | |
|---|---|---|
| PATENT NO. | : 7,895,585 B2 | Page 1 of 1 |
| APPLICATION NO. | : 11/223670 | |
| DATED | : February 22, 2011 | |
| INVENTOR(S) | : Prakash et al. | |

It is certified that error appears in the above-identified patent and that said Letters Patent is hereby corrected as shown below:

In column 16, line 44 delete the word "cods" and replace with "code".
In column 16, line 59 delete the word "coda" and replace with "code".
In column 18, line 33 delete the word "on" and replace with "one".

Signed and Sealed this
Twenty-first Day of June, 2011

David J. Kappos
*Director of the United States Patent and Trademark Office*